(12) United States Patent
Zhang (10) Patent No.: US 12,543,133 B2
(45) Date of Patent: Feb. 3, 2026

(54) METHOD, USER EQUIPMENT, AND BASE STATION

(71) Applicant: GUANGDONG OPPO MOBILE TELECOMMUNICATIONS CORP., LTD., Guangdong (CN)

(72) Inventor: Wenfeng Zhang, Plano, TX (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 338 days.

(21) Appl. No.: 18/502,067

(22) Filed: Nov. 5, 2023

(65) Prior Publication Data

US 2024/0064672 A1 Feb. 22, 2024

Related U.S. Application Data

(63) Continuation of application No. PCT/IB2022/054298, filed on May 9, 2022.

(60) Provisional application No. 63/186,757, filed on May 10, 2021.

(51) Int. Cl.
 *H04W 56/00* (2009.01)
(52) U.S. Cl.
 CPC ..... *H04W 56/0015* (2013.01); *H04W 56/003* (2013.01)
(58) Field of Classification Search
 CPC .......... H04W 56/0015; H04W 56/003
 USPC ......... 370/329
 See application file for complete search history.

(56) References Cited

U.S. PATENT DOCUMENTS

| 2019/0045468 | A1 | 2/2019 | Blasco Serrano et al. |
| 2020/0267672 | A1 | 8/2020 | Chien et al. |
| 2020/0322908 | A1 | 10/2020 | Prakash et al. |
| 2021/0120512 | A1 | 4/2021 | Uchiyama |
| 2021/0218489 | A1* | 7/2021 | Xu ..................... H04W 56/004 |
| 2022/0240208 | A1* | 7/2022 | Chien ................. H04W 56/004 |
| 2023/0217386 | A1* | 7/2023 | Orsino ................. H04W 48/12 370/503 |
| 2023/0292271 | A1* | 9/2023 | Zou ..................... H04W 56/001 |
| 2024/0089813 | A1* | 3/2024 | Zou .................... H04W 36/0007 |

FOREIGN PATENT DOCUMENTS

| WO | 2020063535 | 4/2020 |
| WO | 2020093000 | 5/2020 |

OTHER PUBLICATIONS

EPO, Extended European Search Report for EP Application No. 22806939.9, Nov. 15, 2024.
WIPO, International Search Report and Written Opinion for International Application No. PCT/IB2022/054298, Jul. 28, 2022.

* cited by examiner

*Primary Examiner* — Robert J Lopata
(74) *Attorney, Agent, or Firm* — Hodgson Russ LLP (57) ABSTRACT

A method, a user equipment (UE), and a base station (BS) are disclosed. The method includes: receiving, at a UE, a configuration message comprising a set of condition parameters, updating a UE configuration based on the set of condition parameters, receiving a set of transmissions at the UE, selecting a target transmission of the set of transmissions based on the UE configuration, wherein the target transmission comprises reference time information, and determining a clock time for the UE based on the reference time information.

20 Claims, 4 Drawing Sheets

METHOD, USER EQUIPMENT, AND BASE STATION

CROSS-REFERENCE TO RELATED APPLICATION(S)

This application is a continuation of International Application No. PCT/M2022/054298, filed May 9, 2022, which claims priority to U.S. Provisional Application No. 63/186,757, filed May 10, 2021, the entire disclosures of which are incorporated herein by reference.

TECHNICAL FIELD

This application relates to the communications field, and more specifically, to a method, a user equipment (UE), and a base station (BS).

BACKGROUND

New Radio (NR) technology enables significant opportunities that broaden the communication capabilities of devices. Various types of higher layer applications make use of time-based information between different devices to perform with accuracy and reliability. For example, the 3GPP specification for 5G NR technology specifies control-to-control communication systems or smart-grid communication systems that rely on accurate time synchronization across two or more devices. Though the specific degree of required time synchronization may differ between different applications, many such applications have time synchronization requirements in the sub-second or sub-millisecond range. Increasing the synchronization accuracy of wireless communication systems between user equipment (UE) and base stations (BS).

SUMMARY

In a first aspect, a method is provided. The method includes: receiving, at a UE, a configuration message comprising a set of condition parameters, updating a UE configuration based on the set of condition parameters, receiving a set of transmissions at the UE, selecting a target transmission of the set of transmissions based on the UE configuration, wherein the target transmission comprises reference time information, and determining a clock time for the UE based on the reference time information.

In a second aspect, a user equipment (UE) is provided. The UE includes: a memory configured to store computer programs, and a processor configured to execute the computer programs stored in the memory to: receive a configuration message comprising a set of condition parameters, update a UE configuration based on the set of condition parameters, receive a set of transmissions at the UE, select a target transmission of the set of transmissions based on the UE configuration, wherein the target transmission comprises reference time information, and determine a clock time for the UE based on the reference time information.

In a third aspect, a base station (BS) is provided. The BS includes: a memory configured to store computer programs, and a processor configured to execute the computer programs stored in the memory to: transmit a set of configuration messages comprising a set of condition parameters wherein the set of configuration messages causes user equipment (UE) to update a UE configuration based on the set of condition parameters, modify a base station (BS) configuration to send reference time information via a set of transmissions, and send the set of transmissions to the UE, wherein receiving the set of transmissions at the UE causes the UE to (i) select a target transmission of the set of transmissions based the target transmission satisfying a condition of the set of condition parameters and (ii) determine a clock time inside the UE based on the reference time information conveyed by the target transmission.

DETAILED DESCRIPTION

In the following description, for the purposes of explanation, numerous specific details are set forth in order to provide a thorough understanding of the implementations of the invention. It will be appreciated, however, by those having skill in the art, that the implementations of the invention may be practiced without these specific details or with an equivalent arrangement. In other cases, well-known structures and devices are shown in block diagram form in order to avoid unnecessarily obscuring the implementations of the invention.

Wireless communication systems often require communication between a base station (i.e., "BS," "gNB," etc.), and user equipment (i.e., "mobile station," "MS," "user equipment," "UE," etc.). The communication may often need to be synchronized to the same time, with a significant degree of precision. The total amount of delay between the device time for a base station and the device time for a mobile station may often require durations less than a millisecond (ms) or even less than a microsecond (µs). While the delay between devices across short distances (e.g., less than 10 m) may be less than one nanosecond (ns), delays between devices across longer ranges may be significant and impair communication performance.

To account for such delays, a communication system may determine an updated clock time and use the clock time to synchronize operations or otherwise schedule operations with greater accuracy. In some implementations, a conventional communication system may compensate for a one-way propagation delay by using a reference clock time provided in a downlink (DL) transmission from a BS to a UE to derive the clock time inside the UE that receives the downlink transmission. A BS may communicate this reference clock time (also referred to as "reference time" in late descriptions) via a unicast message or via a broadcast message or even via both. For example, the BS may send, to a UE, a DL transmission carrying a radio resource control (RRC) information element (IE) that indicates a reference time. Once a UE receives the RRC-IE reference time, the UE may derive an updated clock time from the reference time, which is a step of propagation delay (PD) compensation, based on a PD value determined from a step of propagation delay (PD) estimation. From the clock time synchronization accuracy perspective, it is desired to arrange a PD estimation step and a PD compensation step as close to each other in time as possible, where the PD estimation step could be performed periodically based on certain physical layer signals. However, if the reference time can be received by a UE via both a non-broadcast message and a broadcast message, it could be challenging for the BS to arrange, for all UEs, every PD compensation step to occur closely in time to a PD estimation step, and therefore a conventional communication system with a BS failing to do so may be unable to accurately determine a clock time for a UE. Furthermore, while some implementations use a unicast to indicate transmissions directed to be interpretable by one device, some implementations may use multicast transmissions in place of unicast transmissions without any loss in scope. For example, a system that determines a clock time based on a reference time information conveyed via a unicast message may perform similar operations to determine a clock time based on reference time information conveyed via a multicast message.

Introduced therefore are techniques that include operations to overcome one or more of the issues described above by, for example, restricting the PD compensation step from being performed over both broadcast messages and non-broadcast messages so that the time-relation of being close between the PD estimation step and PD compensation step can be well arranged for any UE to improve clock time synchronization accuracy. In some implementations, a BS may send instructions to a UE that changes one or more UE operations associated with the usage of reference time received from the BS. For example, a BS may send a message to a UE that causes the UE to select the specific type of reference time (broadcast vs. non-broadcast) used to determine a clock time inside the UE itself. In some implementations, a UE may determine a clock time inside itself based on information transmitted via a broadcast message. For example, a BS may perform operations to prevent a UE from using reference time information carried via a DL unicast transmission in the RRC IE of the DL transmission to determine a clock time. In some implementations, a UE may determine a clock time based on the reference time information transmitted via unicast but not the one transmitted via broadcast.

Systems that intelligently derive clock times from broadcast reference time information or unicast reference time information may generate clock times with greater accuracy. The accuracy of these computed clock times may consequently provide greater synchronicity and reduced communication errors. Such accuracy increases provide significant benefits for various applications that rely on a wireless communication system. Furthermore, reducing communication delays may increase the number of compatible devices and compatible base stations for a higher layer application that relies on time synchronization between devices.

Figure 1:
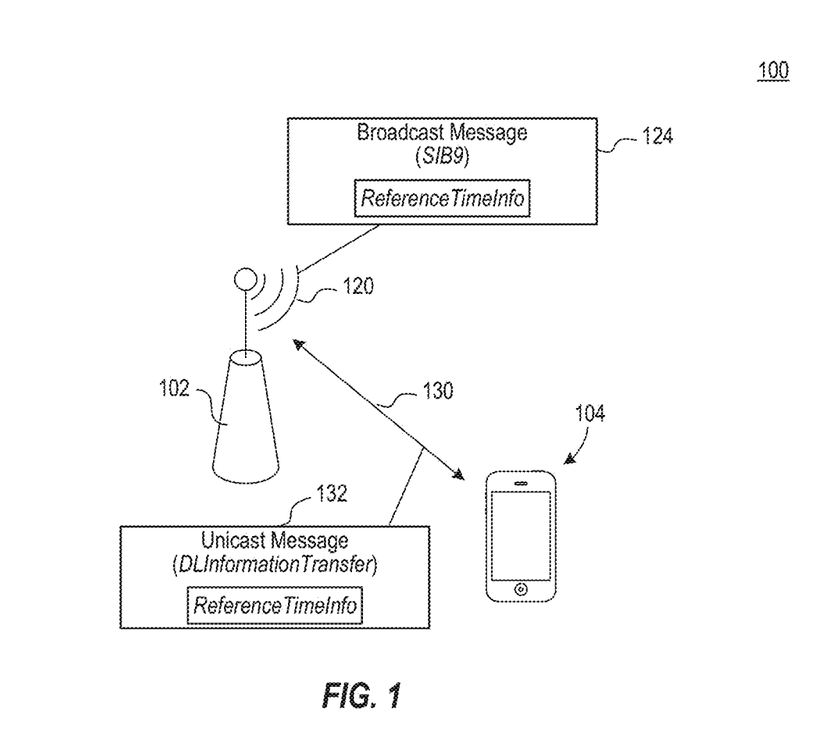
FIG. 1 is a schematic diagram of a wireless communication system in accordance with one or more implementations of the present disclosure.

FIG. 1 is a schematic diagram of a wireless communication system in accordance with one or more implementations of the present disclosure. The wireless communication system 100 may include a BS 102 and a UE 104. The BS 102 may communicate with the UE 104 via a broadcast message 120. Alternatively, or in addition, the BS 12 may communicate with the UE 104 via a unicast message 130. In some implementations, the unicast message 130 may be directed to the UE 104 in a form such that only the UE 104 may receive or decode the unicast message 130.

In some implementations, the broadcast message 120 may include information represented by a box 124. The broadcast message 120 may be a system information (SI) message. For example, the broadcast message 120 may be a SIB9 broadcast message, where a SIB9 message may include information associated with global positioning system (GPS) information or coordinated universal time (UTC) information. Other types of broadcast messages may be used for further other implementations. As shown in the box 124, the broadcast message may include an RRC IE that is labeled or otherwise associated with the target label "ReferenceTimeInfo." In some implementations, the reference time information of the broadcast message may indicate the clock time inside the BS at a system frame number (SFN) boundary at or immediately after the ending boundary of an SI-window in which the broadcast message 120 is transmitted by the BS 102.

Alternatively, or in addition, the unicast message 130 may include reference time information. As shown by a box 132, unicast message 130 may include reference time information that is labeled or otherwise associated with the target label "ReferenceTimeInfo." Some implementations, the reference time information of the unicast message may include a field that indicates the time at the ending boundary of a system frame identified as a reference SFN.

Some implementations may perform operations to determine the clock time based on the reference time information transmitted via the unicast message 130. Alternatively, or in addition, some implementations may perform operations to determine a clock time based on the reference time information transmitted via the broadcast message 120. In various implementations, the UE or BS may be configured such that the UE determines clock times only from broadcasts or only from unicasts. For example, a UE may be configured such that the configuration causes the UE to use only broadcast messages. For example, some implementations may determine a clock time based only on the reference time information conveyed by broadcast messages.

After receiving a broadcast message 120 carrying reference time information "ReferenceTimeInfo" indicated in box 124, the UE 104 may set a local clock time at a corresponding frame boundary as a sum of a time value part of the reference time information and an estimated one-way PD value. For example, the UE 104 may refer to the field value for a parameter "time-r16" that is conveyed in ReferenceTimeInfo. The field value for the parameter "time-16" may indicate the clock time in the BS at an SFN boundary that is at or immediately after the ending boundary of an SI-window in which the broadcast was transmitted from the BS 102. The UE 104 may then use the "time-16" parameter to determine a clock time of its own that is synchronized to that in BS. For example, as a PD compensation step, some implementations may use Equation 1 below to determine a UE-side clock time $t_{UE,Rx}(j_{PDC})$ at time of $j_{PDC}$, subject to a UE-side receiving timing error of $e_{UE,Rx}(j_{PDC})$, based on a BS-side clock time $clk_{gNB}$, which may be conveyed as reference time information and subject to a BS-side transmission timing error of $e_{gNB,Tx}(j_{PDC})$, and where PD is a PD value obtained from the PD estimation step:

$$t_{UE,Rx}(j_{PDC}) = clk_{gNB} + PD \tag{1}$$

For a PD estimation step, some implementations may determine a PD in accordance with Equation 2 below, $\widehat{PD}$ is a true PD, $e_{UE,Rx}(i_{DL})$ is an error value for a UE reception time for a DL subframe $i_{DL}$, which is closest in time to an uplink subframe $j_{UL}$. Parameter "$e_{UE,Tx}(j_{UL})$" is an error value for a UE transmission time for $j_{UL}$, and $e_{gNB,Rx}(i_{UL})$ is the error value for a BS reception time for the uplink subframe $i_{UL}$, where the uplink subframe $i_{UL}$ contains a synchronization reference signal, such as a sounding reference signal (SRS), transmitted by a UE. Parameter "$e_{gNB,Tx}(j_{DL})$" is an error value for a gNB transmission time for the DL subframe $j_{DL}$. Parameter "$e_Q$" is an error value for quantization of RTT (Rx-to-Tx) time difference delivered between the BS and the UE.

$$PD = \hat{PD} + \frac{[e_{UE,Rx}(i_{DL}) - e_{UE,Tx}(j_{UL})] + [e_{gNB,Rx}(i_{UL}) - e_{gNB,Tx}(j_{DL})] + e_Q}{2} \quad (2)$$

In some implementations, the true one-way PD value $\hat{PD}$ may be represented by Equation 3 below, where $\hat{t}_{UE,Rx}(i_{DL})$ is the true reception time for the DL subframe $i_{DL}$, $\hat{t}_{UE,Tx}(j_{UL})$ is the true UE transmission time for $j_{UL}$, $\hat{t}_{gNB,Rx}(i_{UL})$ is the true BS reception time for the uplink subframe $i_{UL}$, and where $\hat{t}_{gNB,Tx}(j_{DL})$ is a true gNB transmission time for the DL subframe $j_{DL}$:

$$\hat{PD} = \frac{[\hat{t}_{UE,Rx}(i_{DL}) - \hat{t}_{UE,Tx}(j_{UL})] + [\hat{t}_{gNB,Rx}(i_{UL}) - \hat{t}_{gNB,Tx}(j_{DL})]}{2} \quad (3)$$

In some implementations, the broadcast message 120 or the unicast message 130 may convey the reference time information that may be used to populate the time values for $\hat{t}_{gNB,Rx}(i_{UL})$ or $\hat{t}_{gNB,Tx}(j_{DL})$. Similarly, the UE 104 may convey an uplink message in response to the unicast message 130, where the uplink message may include time values for $\hat{t}_{UE,Rx}(i_{UL})$ or $\hat{t}_{UE,Tx}(j_{DL})$. After determining a clock time based on reference time information conveyed via broadcast or unicast messages, a UE may then determine a PD value or otherwise determine when to send an uplink message or perform another operation in sync with a BS based on the PD value. Some implementations may reduce the total error in clock time synchronization if the time instances of $\{j_{PDC}, i_{DL}, j_{DL}\}$ are close to each other so that the two UE reception timing errors of $e_{UE,Rx}(j_{PDC})$ and $e_{UE,Rx}(i_{DL})$ are highly correlated or identical to each other, and the two BS transmission timing errors of $e_{gNB,Tx}(j_{PDC})$ and $e_{gNB,Tx}(j_{DL})$ are highly correlated or identical to each other. Some implementations may reduce the error in such a way by always using a first DL transmission that is used by a UE to determine an RTT to select a DL transmission for clock time determination. In some implementations, a UE may be configured to restrict the second DL transmission used to determine a clock time to be DL transmissions of a specific type. For example, the second DL transmission may be restricted to be a broadcast message, a unicast message, a specific type of broadcast message, a specific type of unicast message, etc., in order to reduce error.

Figure 2:
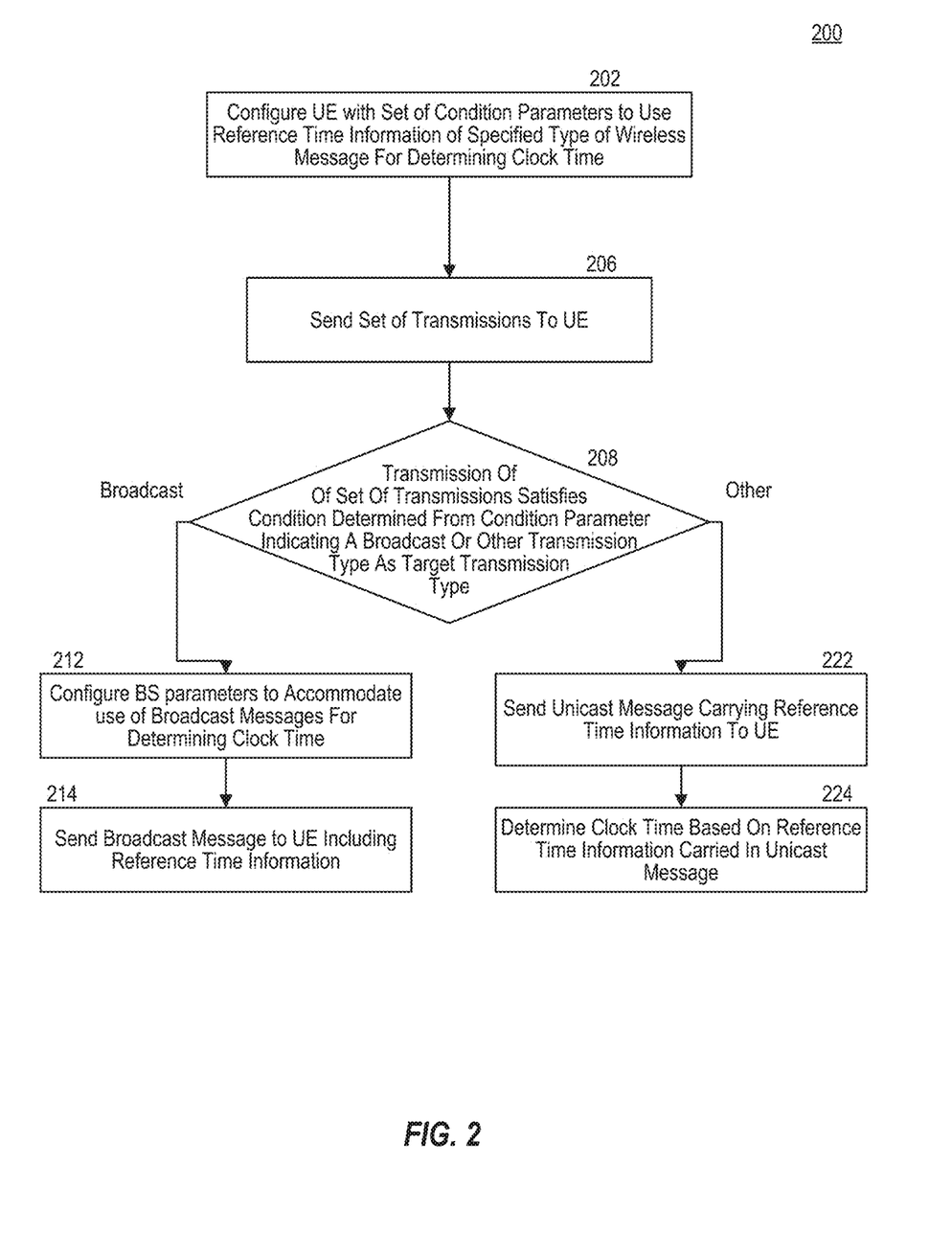
FIG. 2 is a flowchart of a process to configure a UE to determine a clock time that is to be synchronized to a clock time in base station based on transmissions, in accordance with one or more implementations of the present technology.

FIG. 2 is a flowchart of a process 200 to configure a UE to determine its clock time based on transmissions, in accordance with one or more implementations of the present technology. Some implementations may configure a UE with a set of condition parameters to use reference time information of specified type of transmission for clock time determination, as indicated by block 202. For example, a BS, such as the BS 102, may send a set of configuration messages to a UE, such as the UE 104. After the UE receives an initial set of configuration parameter values from a BS, the UE may update its respective UE configuration. For example, the UE may update its respective UE configuration to cause the UE to use broadcast-carried reference time information for clock time determination without using unicast-carried time values for common determination. After updating a UE configuration to determine clock times without using reference time information conveyed by unicasts, the UE may determine a sequence of clock times using reference time information conveyed by only broadcast messages. Alternatively, the UE may receive an initial set of configuration parameter values that causes the UE to use unicast-carried time values for clock time determination and not use broadcast-carried time values for clock time determination. Alternatively, or in addition, the UE may receive a set of configuration parameter values via Wi-Fi signals or other types of signals.

In some implementations, a UE may receive instructions and, based on the instructions, configure a condition parameter such that the UE is to determine a clock time using broadcast-carried reference information. Configuring the condition parameter may include updating a field value of the condition parameter in a system configuration of the UE. Updating a parameter may include toggling a Boolean value, adding a string, removing a string, performing another update operation such that a UE configuration before the update operation is different from a UE configuration after the update operation. For example, a UE configuration may be updated such that a field value for a UE parameter is set from "unicast" to "broadcast." In some implementations, setting a UE parameter to indicate that the UE is to determine a clock time from a broadcast may cause the UE to ignore or otherwise not use time values sent in unicast messages. Alternatively, or addition, setting a UE parameter to indicate that the UE is to determine a clock time from a unicast message may cause the UE to ignore or otherwise not use time values sent in broadcast messages.

Some implementations may send, from a BS, a set of transmissions to the UE, as indicated by block 206. For example, a BS may send a set of transmissions that includes a broadcast message and a unicast message to a UE. In some implementations, the broadcast sent from the BS may be a SIB message that is broadcast periodically or semi-periodically. For example, the broadcast message may be a SIB9 broadcast that carries a GPS time and coordinated universal time (UTC). In some implementations, a time value sent in the broadcast message may be used as a reference time value to determine a clock time. For example, the GPS time carried by SIB9 broadcast may be used as a reference time value to determine a clock time using operations described in this disclosure.

Some implementations may determine whether a transmission of a set of transmissions satisfies a condition determined from a condition parameter indicating a broadcast or other transmission type as a target transmission type, as indicated by block 208. In some implementations, a UE may be configured by a set of configuration parameters to select broadcast messages as target transmissions for determining clock times. For example, a UE may first be configured such that a field value of a condition parameter indicating broadcast transmissions is set to "broadcast." The UE may then receive a set of transmissions that include both broadcasts and unicasts. The UE may then select a broadcast transmission amongst the set of transmissions based on a determination that the selected transmission has a message type of "broadcast." The UE may then use the reference time information of the broadcast to determine a clock time. Furthermore, in some implementations, a UE may be configured to use a specific type of broadcast message to determine a clock time, such as a specific type of SIB message (e.g., a SIB9 message).

Alternatively, a UE may first be configured such that a field value of a condition parameter indicating broadcast transmissions is set to "unicast." The UE may then receive a set of transmissions that include both broadcasts and unicasts. The UE may then select a unicast transmission amongst the set of transmissions based on a determination that the selected transmission has a message type of "unicast." The UE may then use the reference time information of the unicast to determine a clock time using operations disclosed in this disclosure. Furthermore, in some implementations, a UE may be configured to use a specific type of unicast message to determine a clock time, such as a specific type of RRC message.

In some implementations, a UE may read a field value for a parameter indicating which type of message is permitted for delivering reference time values used to determine a clock time. For example, after a UE has updated its configuration by updating a parameter to indicate that the UE is to use broadcast messages to determine clock times, the UE may receive a SIB9 broadcast. The UE may then determine that a time value carried by the SIB9 message is permitted to determine a clock time. In some implementations, the field value of the parameter may be configured such that the UE is prevented from using unicast messages to determine a clock time, as described elsewhere in this disclosure. For example, some implementations may receive a sequence of transmissions such that unicasts are interspersed in the sequence of broadcasts. In some implementations, a configuration parameter set to indicate broadcasts may cause the UE to determine a sequence of clock times based only on the broadcasts of the sequence of transmissions. Alternatively, a UE may be configured by a set of configuration parameters to select only unicast messages as target transmissions for determining clock times. For example, the field value of a UE parameter may be configured such that the UE is prevented from using broadcast messages to determine a clock time. In such implementations, a configuration parameter set to indicate unicasts may cause the UE to determine a sequence of clock times based only on the unicasts of a sequence of transmissions that includes broadcasts and unicasts.

In response to a determination that the UE is configured such that the UE may determine a clock time from a broadcast-carried time value, operations of the process 200 may proceed to perform operations described by block 212. Alternatively, in response to a determination that the UE is configured such that the UE may determine a clock time from a unicast or other non-broadcast transmission, operations of the process 200 may proceed to perform operations described by block 222.

Some implementations may configure BS parameters of a BS configuration to accommodate the use of broadcast messages for determining clock time, as indicated by block 212. In some implementations, the BS may perform operations to update its BS configuration, such as BS parameters related to unicast messages. In some implementations, the updated parameters may prevent a BS from sending reference time information in unicast messages to a UE. For example, some implementations may configure a BS configuration to remove outgoing reference time information for a specified UE. Alternatively, some implementations may update a BS configuration to remove outgoing reference time information for all UEs. For example, a BS may update configuration parameters associated with a unicast RRC message such that the unicast RRC message does not include a time value that would have been used to determine a clock time. By ensuring that a base station does not send reference time values via unicast messages, a UE may be restricted to determining clock times from broadcasts by default. For example, a UE may determine a sequence of clock times based on a sequence of broadcast messages sent by a BS such that the UE receives a unicast message from the BS between broadcasts of the sequence of broadcast messages. In some implementations, the BS may be configured such that the unicast message does not include reference time information.

In some implementations, the configuration of one or more BS parameters of a BS configuration may result in changes to information that is labeled according to a communication standard, such as a 3GPP standard. For example, a BS may update its own parameters such that the BS does not send a unicast "DLInformationTransfer" message that contains an RRC IE having the target label "ReferenceTimeInfo." While the label "ReferenceTimeInfo" is indicated as a target label, other implementations select use other labels as target labels. In some implementations, preventing unicast messages from providing reference time information used to determine a clock time while still sending the reference time information via broadcasts increase the accuracy of clock times.

Some implementations may send a broadcast message to a UE that includes reference time information, as indicated by block 214. For example, some implementations may send a broadcast to a UE that includes a GPS time or a UTC value that by the UE as a reference time value to determine a clock time. In some implementations, the BS may proactively update a parameter associated with the delivery of a broadcast message to include reference time information. For example, a BS that originally did not send a SIB9 broadcast message may be configured to send the SIB9 broadcast message in response to a determination that a UE is configured to determine clock times based on broadcast-carried reference time information. Alternatively, a BS may have been configured to deliver reference time information before a determination of what parameter values populate a UE configuration. Furthermore, while a BS may send a SIB9 message that is used by a UE to determine a clock time in some implementations, another BS may send other types of broadcasts (e.g., other types of SIB messages, MIB messages, other messages carried over a physical broadcast channel (PBCH), etc. Furthermore, a broadcast message may cause the UE to determine a UE-side clock time after receiving the broadcast based on reference time information conveyed by the broadcast using an implementation of Equation 1.

In some implementations, both the UE and the BS may perform one-way RTT determination, where the UE may determine the RTT based on a clock time. The UE may perform clock time estimation within a delay threshold with respect to a similar clock time estimation operation being performed by a UE. For example, after a UE receives an RRC message from a BS, the UE may perform a first set of operations to estimate a clock time and corresponding RTT, where the first set of operations may be performed within a delay threshold of a BS performing a similar RTT-determining operation to determine an RTT from a BS's perspective. The delay threshold may be one of various values, such as a value greater than 1 picosecond (ps), a value greater than 1 ns, a value greater than 1 µs, a value greater than 1 ms, etc.

In some implementations, a UE may determine a clock time based on reference time information obtained via a broadcast message. In some implementations, the UE may then compute a clock time using operations described elsewhere in this disclosure. In some implementations, the UE may determine a one-way RTT within a delay threshold with respect to RTT determination by a BS. The UE may then determine a planned response time corresponding to the broadcast based on the one-way RTT and send an uplink message to a BS during the planned response time.

Some implementations may send, to a UE, a unicast message carrying reference time information, as indicated by block 222. For example, some implementations may send an RRC message to a UE, where the RRC message carries an RRC IE having the target label "ReferenceTimeInfo." The RRC message may be a standardized RRC message that is categorized in a 3GPP standard, such as the RRC message "DLInformationTransfer." For example, in some implementations, a UE may be configured to determine a clock time using only reference time information stored in "DLInformationTransfer" RRC messages. Furthermore, while some implementations may use the "DLInformationTransfer" RRC message, some implementations may instead use other unicast messages to deliver reference time information usable by a UE to determine a clock time.

Some implementations may determine a clock time based on reference time information carried in the unicast message, as indicated by block 224. In some implementations, the clock time may be determined by a BS instead of a UE, where the clock time may then be sent to a UE for further use. Furthermore, both a UE and a BS may determine PD values in the form of a one-way delay estimation in some implementations. In some implementations, the UE may perform a one-way delay estimation within a delay threshold with respect to the transmission of a SIB9 broadcast. For example, before a UE receives a SIB9 broadcast message from a BS, the UE may perform operations to estimate a PD value, where the operations may be performed within 50 ms of receiving the broadcast message. In some implementations, the BS may perform operations to determine a clock time similar to operations performed by a UE. For example, a BS may implement operations described by Equation 1 to determine clock times, where this information may also be used to determine PD values or other UE-side time information.

In some implementations, both the UE and the BS may perform one-way RTT determination. The BS may perform PD value estimation within a delay threshold with respect to a similar UE value estimation operation being performed by a UE. For example, after a BS receives a transmission from a UE, the BS may perform a first set of operations to estimate a clock time and corresponding RTT, where the BS is configured to perform the first set of operations within a delay threshold of a UE performing a similar set of operations to determine an RTT from a UE's perspective. As described elsewhere, the delay threshold may be one of various values, such as a value greater than 1 ps, a value greater than 1 ns, a value greater than 1 µs, a value greater than 1 ms, etc.

Figure 3:
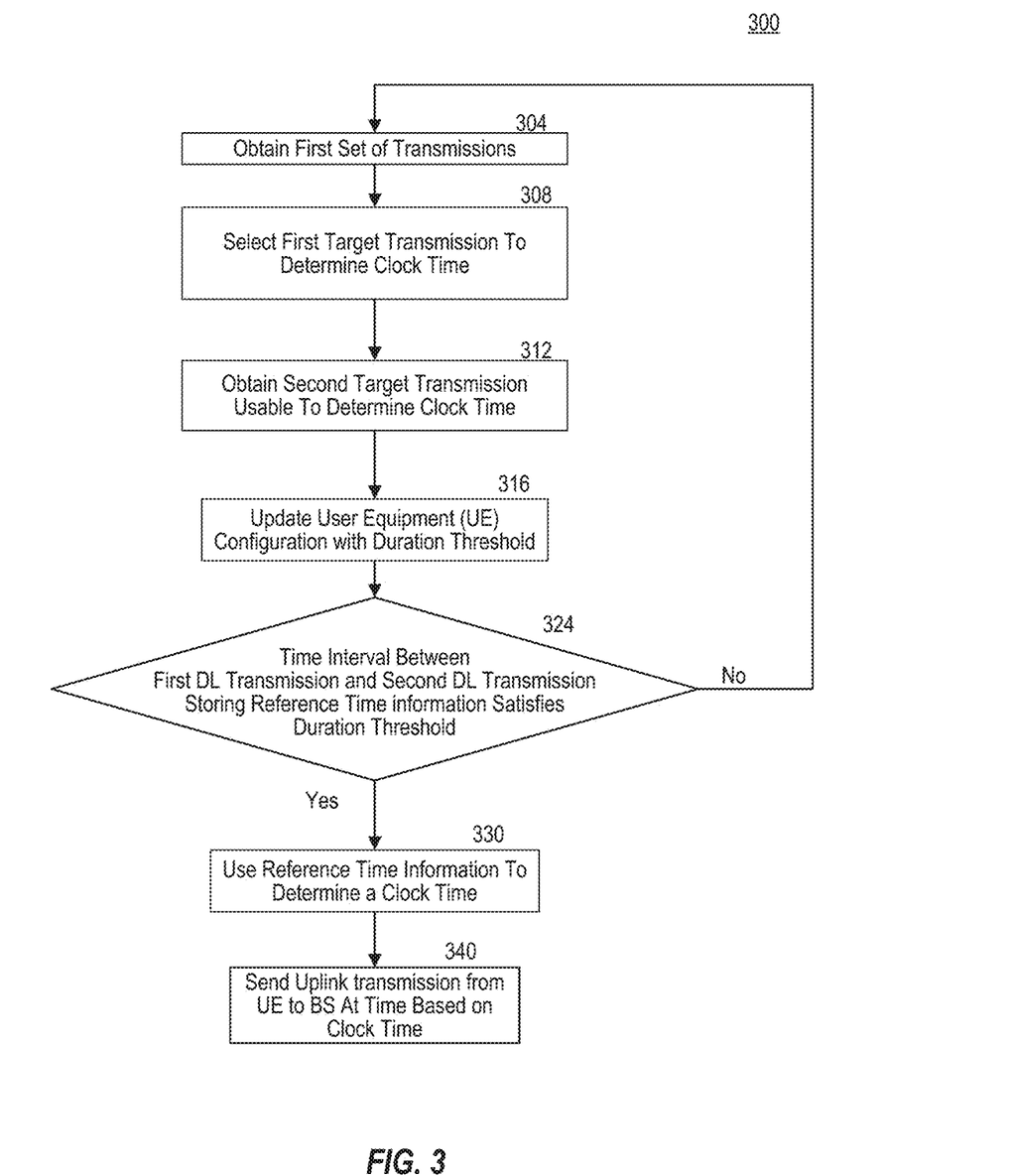
FIG. 3 is a flowchart of a process to configure a UE with a duration threshold to select a reference time for delay compensation, in accordance with one or more implementations of the present technology.

FIG. 3 is a flowchart of a process to configure a UE with a duration threshold to select a reference time for delay compensation, in accordance with one or more implementations of the present technology. Some implementations may obtain a first set of transmissions, as indicated by block 304. In some implementations, the first set of transmissions may include a set of DL transmissions, one or more of which may be used to perform PD estimation. For example, a UE may obtain a first set of DL transmissions that includes a plurality of broadcast transmissions or non-broadcast transmissions.

Some implementations may select a first target transmission of the first set of transmissions to determine a clock time, as indicated by block 308. For example, a UE may select, for use as a first target transmission for clock time determination, a latest DL transmission that was previously used to determine an RTT for a UE. In some implementations, the UE may select the previously used DL transmission based on a determination that a finer-granularity RTT is required. For example, a UE may determine whether an RTT granularity threshold is satisfied by a UE-calculated RTT estimate. Based on a determination that the UE-calculated RTT estimate does not satisfy the RTT granularity threshold, the UE may select the latest DL transmission used by the UE as a target transmission. For example, a UE may determine that an operational requirement has set a granularity threshold to 90 ns. Based on a determination that the UE-calculated RTT does not satisfy the granularity threshold, some implementations may select the first target transmission to be the latest previously used DL transmission, where the latest previously used DL transmission was used to determine a UE-calculated RTT. The granularity threshold may be one of various values, such as a value greater than 1 ps, a value greater than 1 ns, a value greater than 1 µs, a value greater than 1 ms, etc.

Alternatively, the UE may select a previously used DL transmission based on a determination that the previously used DL transmission satisfies a set of conditions. The set of conditions may include a condition that the previously used transmission was the most recently received DL transmission, a condition that the previously used DL transmission was already used by the UE to determine the RTT, etc. In some implementations, a UE configuration or BS configuration may store thresholds, conditions, parameters of conditions, or other values which are used to select a transmission.

Alternatively, a UE may select, for use as a first target transmission for determining a clock time, a DL transmission that was used to determine an uplink time for an uplink reference signal. For example, a UE may be configured to determine that a UE-determined RTT satisfies an RTT granularity threshold. Based on a determination that the RTT granularity threshold is satisfied, the UE may use the latest DL transmission received by the UE as a first target transmission. For example, a UE may determine that an operational requirement has set a granularity threshold to be one microsecond and that a UE-determined RTT value has a granularity lower than one microsecond. In response, the UE may select a most recently received DL transmission as the first target transmission for compensation.

Alternatively, the UE may select a previously used DL transmission used to determine an uplink time based on a determination that a set of conditions is satisfied by the previously used DL transmission. Alternatively, the UE may select a previously used DL transmission based on a determination that the previously used DL transmission satisfies a set of conditions. The set of conditions may include a condition that the previously used transmission was the most recently received DL transmission, a condition that the previously used DL transmission was already used by the UE to determine an uplink time, etc.

Some implementations may obtain a second transmission usable to determine the clock time, as indicated by block 312. For example, some implementations may obtain a DL transmission storing reference time information and select the DL transmission as a second target transmission. In some implementations, a UE may use the reference time information based on a determination that the second target transmission is of a permitted message type. For example, after receiving a DL transmission, some implementations may select the DL transmission as the second target transmission based on a determination that the message type of the second target transmission matches the field value "unicast" for a corresponding configuration parameter of the UE. A UE may then use the reference time information conveyed by the DL transmission to determine a compensation value. For example, a UE may obtain a broadcast transmission, such as a SIB9 broadcast, and obtain a time value from an RRC IE conveyed by the SIB9 message.

Some implementations may update a UE configuration based on a duration threshold, as indicated by block 316. In some implementations, a system may update a UE configuration by sending a transmission to the UE that updates a semi-static configuration to include a duration threshold. For example, a BS may send a transmission to a UE conveying a duration threshold L, where L may be a time value less than five seconds, a time value less than one second, a time value less than 1.0 ms, a time value less than 1.0 µs, a time value less than 1.0 nanosecond, etc.

Some implementations may determine whether a time interval between the first target transmission and the second target transmission satisfies the duration threshold, as indicated by block 324. In some implementations, a system may restrict the types of messages that can be used for compensation value determination to be messages that satisfy the duration threshold. In some implementations, satisfying a duration threshold with a time interval may include determining that a time interval is less than the duration threshold. Alternatively, in some implementations, satisfying a duration threshold with a time interval may include determining that the time interval is less than or equal to the duration threshold. The UE may then receive a first target transmission and a second target transmission and determine whether a RRC IE labeled "ReferenceTimeInfo" of the first target transmission is within the duration threshold of the RRC IE "ReferenceTimeInfo" of the second target transmission. For example, a UE may be configured with the duration threshold, 1.5 µs and the difference between the respective time values labeled "ReferenceTimeInfo" of the first and second target transmissions may be less than 1.5 µs.

In response to a determination that the time interval between the first and second target transmission satisfies the duration threshold, operations of the process 300 may proceed to block 330. Otherwise, operations of the process 300 may stop or return to perform operations described by blocks 304, 308, 312, or 316. For example, as shown in FIG. 3, operations of the process 300 may return to block 304.

Some implementations may use the reference time information to determine a clock time, as indicated by block 330. In some implementations, a UE may use reference time information of the latest DL transmission that was previously used to determine the latest UE-side RTT to determine a clock time. Some implementations may benefit from using the previously used DL transmission because BS-side RTT can have a finer granularity than a timing advance command that controls the UE-side RTT. Alternatively, as described elsewhere in this disclosure, a UE may use, to determine a clock time, a most recent DL transmission that was used to determine an uplink time for the most recent uplink reference signal. For example, a most recent uplink reference signal transmission may be a sounding reference signal (SRS), and a UE may select a DL transmission used to determine the uplink time for the SRS as a target transmission. Once the reference time information is received by a UE, the UE may use an implementation of Equation 1 to determine the UE-side clock time based on the reference time information.

Some implementations may send a transmission at a time determined based on the clock time, as indicated by block 340. Operations to send a transmission from a UE at a time determined based on the clock time may be similar to those described elsewhere in this disclosure, such as operations described by block 216.

Figure 4:
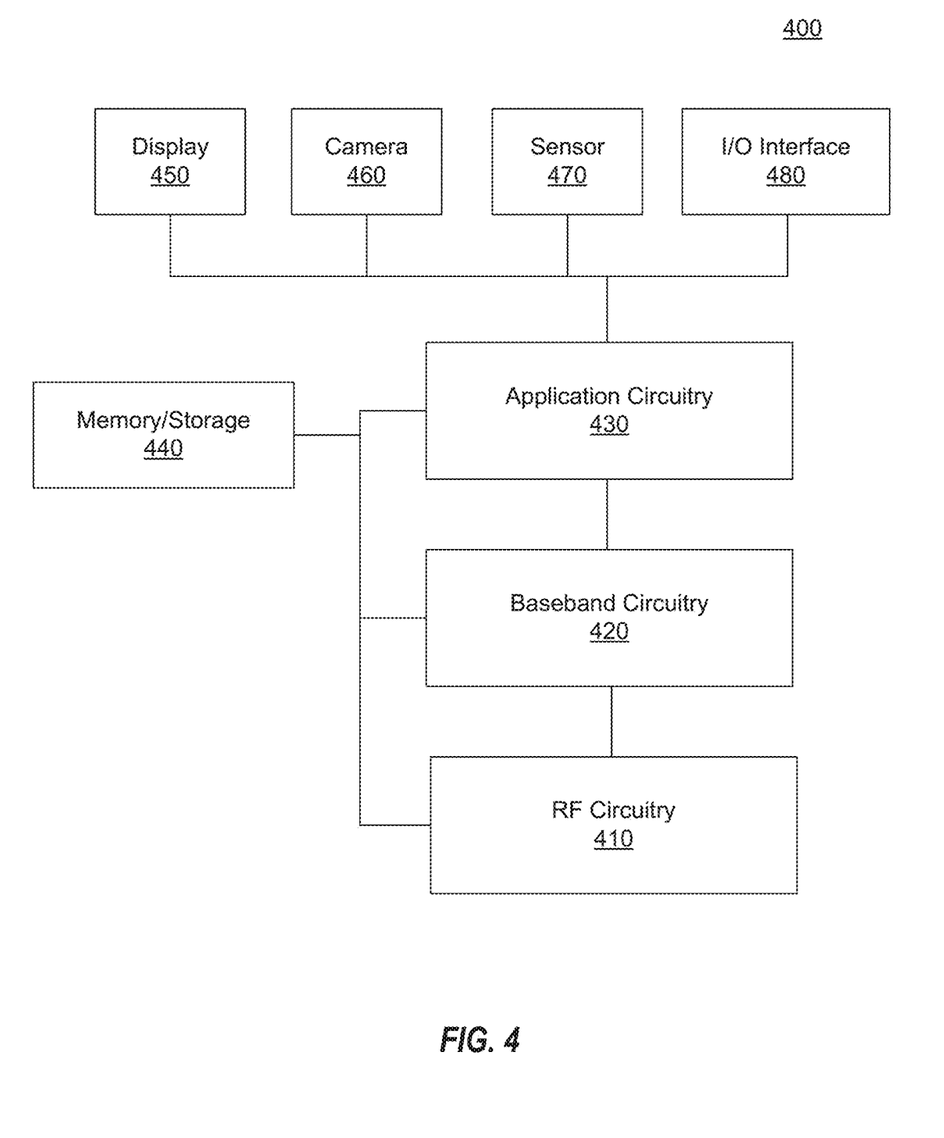
FIG. 4 is a block diagram of a system for wireless communication, in accordance with one or more implementations of the present technology.

FIG. 4 is a block diagram of a system for wireless communication, in accordance with one or more implementations. FIG. 4 is a block diagram of an example system 400 (e.g., the UE 104 of FIG. 1 or the BS 102 of FIG. 1) for wireless communication according to an implementation of the present disclosure. Implementations described herein may be implemented into the system using any suitably configured firmware, hardware, or software. FIG. 4 illustrates the system 400 including a radio frequency (RF) circuitry 410, a baseband circuitry 420, an application circuitry 430, a memory/storage 440, a display 450, a camera 460, a sensor 470, and an input/output (I/O) interface 480, coupled with each other at least as illustrated. For example, the system 400 may use the RF circuitry 410 to send wireless messages, such as a DL transmission, uplink transmission, broadcast transmission, etc.

The application circuitry 430 may include a circuitry, such as, but not limited to, one or more processing devices (e.g., a digital processor, a single-core processor, a multi-core processor, an analog processor, a digital circuit designed to process information, an analog circuit designed to process information, a state machine, or other mechanisms for electronically processing information). The processors may include any combinations of general-purpose processors and dedicated processors, such as graphics processors and application processors. The processors may be coupled with the memory/storage 440 and configured to execute instructions stored in the memory/storage 440 to enable various applications or operating systems running on the system. The processing devices may include one or more devices executing some or all of the operations of the methods in response to instructions stored electronically on an electronic storage medium. The processing devices may include one or more devices configured through hardware, firmware, or software to be specifically designed for execution of one or more of the operations of the methods. For example, it should be noted that any of the computer devices of a UE discussed in this disclosure could be used to perform one or more of the operations described in of the processes 200 or 300.

The baseband circuitry 420 may include a circuitry, such as, but not limited to, one or more single-core or multi-core processors, logic circuits, or the like. The baseband circuitry 420 may include a baseband processor. The baseband circuitry 420 may handle various radio control functions that enable communication with one or more radio networks via the RF circuitry. The radio control functions may include, but are not limited to, signal modulation, encoding, decoding, radio frequency shifting, etc. In some implementations, the baseband circuitry may provide for communication compatible with one or more radio technologies. For example, in some implementations, the baseband circuitry may support communication with an evolved universal terrestrial radio access network (EUTRAN) or other wireless metropolitan area networks (WMAN), a wireless local area network (WLAN), a wireless personal area network (WPAN). Implementations in which the baseband circuitry is configured to support radio communications of more than one wireless protocol may be referred to as multi-mode baseband circuitry.

In various implementations, the baseband circuitry 420 may include circuitry to operate with signals that are not strictly considered as being in a baseband frequency. For example, in some implementations, baseband circuitry may include circuitry to operate with signals having an intermediate frequency, which is between a baseband frequency and a radio frequency.

The RF circuitry 410 may enable communication with wireless networks using modulated electromagnetic radiation through a non-solid medium. In various implementations, the RF circuitry may include antennas, switches, filters, amplifiers, control logic, etc. to facilitate the communication with the wireless network. For example, the RF circuitry 410 can include a front-end device that processes the baseband signal to generate an outgoing signal or generate the baseband signal from a received signal.

In various implementations, the RF circuitry 410 may include circuitry to operate with signals that are not strictly considered as being in a radio frequency. For example, in some implementations, RF circuitry may include circuitry to operate with signals having an intermediate frequency, which is between a baseband frequency and a radio frequency.

In various implementations, the transmitter circuitry, control circuitry, or receiver circuitry discussed above with respect to the user equipment, eNB, or gNB may be embodied in whole or in part in one or more of the RF circuitry, the baseband circuitry, or the application circuitry. As used herein, "circuitry" may refer to, be part of, or include an Application Specific Integrated Circuit (ASIC), an electronic circuit, a processor (shared, dedicated, or group), or a memory (shared, dedicated, or group) that execute one or more software or firmware programs, a combinational logic circuit, or other suitable hardware components that provide the described functionality. In some implementations, the electronic device circuitry may be implemented in, or functions associated with the circuitry may be implemented by, one or more software or firmware modules.

In some implementations, some or all of the constituent components of the baseband circuitry, the application circuitry, or the memory/storage may be implemented together on a system on a chip (SOC).

The memory/storage 440 may be storage media used to load and store data or instructions. The memory/storage for one implementation may include any combination of suitable volatile memory, such as dynamic random-access memory (DRAM), or non-volatile memory, such as flash memory. Each of the devices described in this disclosure may include electronic storages such as the memory/storage 440 or other types of electronic storage. The electronic storages may include non-transitory storage media that electronically stores information. The storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), or other electronically readable storage media. The electronic storages may include one or more virtual storage resources (e.g., cloud storage, a virtual private network, or other virtual storage resources). An electronic storage may store software algorithms, information determined by the processors, information obtained from servers, information obtained from client devices, or other information that enables the functionality as described herein.

In various implementations, the I/O interface 480 may include one or more user interfaces designed to enable user interaction with the system or peripheral component interfaces designed to enable peripheral component interaction with the system. With respect to the components of computer devices described in this disclosure, each of these devices may receive content and data via input/output (i.e., "I/O") paths. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

Devices described in this disclosure may also include processors or control circuitry to send and receive commands, requests, and other suitable data using the I/O paths. The control circuitry may comprise any suitable processing, storage, or input/output circuitry. Further, some or all of the computer devices described in this disclosure may include a user input interface or user output interface (e.g., a display) for use in receiving and displaying data. In some implementations, a display such as a touchscreen may also act as user input interfaces. It should be noted that in some implementations, one or more devices described in this disclosure may have neither user input interface nor displays and may instead receive and display content using another device (e.g., a dedicated display device such as a computer screen or a dedicated input device such as a remote control, mouse, voice input, etc.). Additionally, one or more of the devices described in this disclosure may run an application (or another suitable program) that performs one or more operations described in this disclosure.

In various implementations, the sensor 470 may include one or more sensing devices to determine environmental conditions or location information related to the system. In some implementations, the sensors may include, but are not limited to, a gyro sensor, an accelerometer, a proximity sensor, an ambient light sensor, and a positioning unit. The positioning unit may also be part of, or interact with, the baseband circuitry or RF circuitry to communicate with components of a positioning network, e.g., a global positioning system (GPS) satellite.

In various implementations, the display 450 may include a display, such as a liquid crystal display and a touch screen display. In various implementations, the system 400 may be a mobile computing device such as, but not limited to, a laptop computing device, a tablet computing device, a netbook, an ultrabook, a smartphone, etc. In various implementations, system may have more or less components, or different architectures. Where appropriate, methods described herein may be implemented as a computer program. The computer program may be stored on a storage medium, such as a non-transitory storage medium.

In some implementations, the various devices and subsystems illustrated in FIG. 1 or FIG. 4 may include one or more computer devices that are programmed to perform the functions described herein. The computing devices may include one or more electronic storages one or more physical processors programmed with one or more computer program instructions, or other components. The computing devices may include communication lines or ports to enable the exchange of information with a set of networks or other computing platforms via wireless techniques. The network may include the Internet, a mobile phone network, a mobile voice or data network (e.g., a 5G or LTE network), or other types of communications networks or combinations of communications networks. The computing devices may include additional communication paths linking a plurality of hardware, software, or firmware components operating together.

The processors may be programmed to provide information processing capabilities in the computing devices. As such, the processors may include one or more of a digital processor, an analog processor, a digital circuit designed to process information, an analog circuit designed to process information, a state machine, or other mechanisms for electronically processing information. In some implementations, the processors may include a plurality of processing units. These processing units may be physically located within the same device, or the processors may represent processing functionality of a plurality of devices operating in coordination. The processors may be programmed to execute computer program instructions by software; hardware; firmware; some combination of software, hardware, or firmware; or other mechanisms for configuring processing capabilities on the processors.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the scope of the appended claims. For example, it is to be understood that the present technology contemplates that, to the extent possible, one or more features of any implementation may be combined with one or more features of any other implementation.

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the described technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative implementations or subcombinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples; alternative implementations may employ differing values or ranges.

In the Detailed Description, numerous specific details are set forth to provide a thorough understanding of the presently described technology. References in this description to "an implementation/embodiment," "one implementation/embodiment," or the like mean that a particular feature, structure, material, or characteristic being described is included in at least one implementation of the described technology. Thus, the appearances of such phrases in this specification do not necessarily all refer to the same implementation/embodiment. On the other hand, such references are not necessarily mutually exclusive either. Furthermore, the particular features, structures, materials, or characteristics can be combined in any suitable manner in one or more implementations/embodiments. It is to be understood that the various implementations shown in the figures are merely illustrative representations and are not necessarily drawn to scale.

Many implementations or aspects of the technology described herein can take the form of computer- or processor-executable instructions, including routines executed by a programmable computer or processor. Those skilled in the relevant art will appreciate that the described techniques can be practiced on computer or processor systems other than those shown and described below. The techniques described herein can be implemented in a special-purpose computer or data processor that is specifically programmed, configured, or constructed to execute one or more of the computer-executable instructions described below. Accordingly, the terms "computer" and "processor" as generally used herein refer to any data processor. Information handled by these computers and processors can be presented at any suitable display medium. Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

As used throughout this application, the word "may" is used in a permissive sense (i.e., meaning having the potential to), rather than the mandatory sense (i.e., meaning must). Furthermore, unless otherwise indicated in this disclosure, use of the word "or" may be inclusive. For example, a set of items including "X" or "Y" may include only "X," only "Y," or both "X" and "Y." The words "include", "including", and "includes" and the like mean including, but not limited to. As used throughout this application, the singular forms "a," "an," and "the" include plural referents unless the context clearly indicates otherwise. Thus, for example, reference to "an element" or "an element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Obtaining data may include generating a request for the data and receiving the data from a data source in response to the request. Alternatively, or in addition, obtaining data may include receiving the data from a data source without generating a request for the data.

Statements in which a plurality of attributes or functions are mapped to a plurality of objects (e.g., one or more processors performing steps/operations A, B, C, and D)

encompasses both all such attributes or functions being mapped to all such objects and subsets of the attributes or functions being mapped to subsets of the attributes or functions (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. As used in this disclosure, a "set" of items may describe a single item or a plurality of items.

Although certain aspects of the technology are presented below in certain claim forms, the applicant contemplates the various aspects of the technology in any number of claim forms. Accordingly, the applicant reserves the right to pursue additional claims after filing this application to pursue such additional claim forms, in either this application or in a continuing application.

Enumerated Implementations

The present techniques will be better understood with reference to the following enumerated implementations:

1. A method comprising: transmitting a set of configuration messages comprising a set of condition parameters wherein the set of configuration messages causes user equipment (UE) to update a UE configuration based on the set of condition parameters; modifying a base station (BS) configuration to send reference time information via a set of transmissions; sending the set of transmissions to the UE, wherein receiving the set of transmissions at the UE causes the UE to (i) select a target transmission of the set of transmissions based the target transmission satisfying a condition of the set of condition parameters and (ii) determine a clock time for the UE based on the reference time information conveyed by the target transmission.
2. The method implementation 1, wherein the target transmission is a radio resource control (RRC) message, and wherein the reference time information is conveyed via an information element (IE) of the RRC message.
3. The method of any of implementations 1 to 2, wherein the reference time information is identified with a target label, and wherein modifying the BS configuration comprises modifying the BS configuration to not send any unicast message comprising time values identified with the target label.
4. The method of implementation 3, wherein the reference time information is associated with the target label "ReferenceTimeInfo."
5. The method of any of implementations 1 to 4, wherein the set of condition parameters causes the UE to select a broadcast message as the target transmission.
6. The method of any of implementations 1 to 5, wherein selecting the target transmission comprises selecting the target transmission based on a determination that the target transmission is a broadcast message.
7. The method of any of implementations 1 to 2, wherein the set of condition parameters causes the UE to select a unicast message as the target transmission.
8. The method of any of implementations 1 to 7, wherein selecting the target transmission comprises selecting the target transmission based on a determination that the target transmission is a unicast message.
9. A method comprising: receiving, at a UE, a configuration message comprising a set of condition parameters; updating a UE configuration based on the set of condition parameters; receiving a set of transmissions at the UE; selecting a target transmission of the set of transmissions based on the UE configuration, wherein the target transmission comprises reference time information; determining a clock time for the UE based on the reference time information.
10. The method of implementations 9, wherein the set of transmissions comprises both unicast message and broadcast message,
11. The method of any of implementations 9 to 10, wherein updating the UE configuration based on the set of condition parameters comprises restricting the UE from determining clock times based on time values conveyed via unicast messages.
12. The method of any of implementations 9 to 11, wherein selecting the target transmission comprises selecting a broadcast message as the target transmission.
13. The method of implementation 11, wherein: determining the clock time comprises determining a sequence of clock times; and for each respective clock time of the sequence of clock times, determining the respective clock time based on a respective broadcast message of a sequence of broadcast messages.
14. The method of any of implementations 9 to 10, wherein updating the UE configuration based on the set of condition parameters comprises restricting the UE from determining clock times based on time values conveyed via broadcast messages.
15. The method of any of implementations 9 to 14, wherein selecting the target transmission comprises selecting a unicast message, but not any broadcast message, as the target transmission.
16. The method of implementation 15, wherein: determining the clock time comprises determining a sequence of clock times; and for each respective clock time of the sequence of clock times, determining the respective clock time based on a respective unicast message of a sequence of unicast messages but not any broadcast message.

17. The method of any of implementations 9 to 16, wherein the target transmission is a first target transmission, and wherein the configuration message comprises a duration threshold, further comprising: receiving a second target transmission; determining a time interval between the first target transmission and the second target transmission; determining whether the time interval is less than or equal to the duration threshold, wherein determining the clock time comprises determining the clock time in response to a determination that the time interval is less than or equal to the duration threshold.

18. The method of implementation 17, further comprising determining a receiver-to-transmitter time value (RTT) based on a downlink (DL) transmission, wherein selecting the first target transmission comprises selecting, as the first target transmission, the DL transmission based on a determination that the DL transmission was used to determine the RTT.

19. A system comprising: user equipment (UE); and a base station (BS), the BS performing operations comprising: transmitting a set of configuration messages comprising a set of condition parameters wherein the set of configuration messages causes user equipment (UE) to update a UE configuration based on the set of condition parameters; modifying a base station (BS) configuration to send reference time information via a set of transmissions; sending the set of transmissions to the UE, wherein receiving the set of transmissions at the UE causes the UE to (i) select a target transmission of the set of transmissions based the target transmission satisfying a condition of the set of condition parameters and (ii) determine a clock time for the UE based on the reference time information conveyed by the target transmission.

20. The system of implementation 19, wherein the target transmission is a radio resource control (RRC) message, and wherein the reference time information is conveyed via an information element (IE) of the RRC message.

21. The system of any of implementations 19 to 20, wherein the reference time information is identified with a target label "ReferenceTimeInfo".

22. The system of any of implementations 19 to 21, wherein the set of condition parameters causes the UE to select a broadcast message as the target transmission.

23. The system of any of implementations 19 to 22, wherein modifying the BS configuration comprises modifying the BS configuration to not send any unicast message comprising time values identified with the target label.

24. The system of any of implementations 19 to 23, wherein selecting the target transmission comprises selecting the target transmission based on a determination that the target transmission is a broadcast message.

25. The system of any of implementations 19 to 21, wherein the set of condition parameters causes the UE to select a unicast message as the target transmission.

26. The system of any of implementations 19 to 25, wherein selecting the target transmission comprises selecting the target transmission based on a determination that the target transmission is a unicast message.

I claim:

1. A method comprising:
receiving, at a user equipment (UE), a configuration message comprising a set of condition parameters;
updating a UE configuration based on the set of condition parameters;
receiving a set of transmissions at the UE;
selecting a target transmission of the set of transmissions based on the UE configuration, wherein the target transmission comprises reference time information; and
determining a clock time for the UE based on the reference time information.

2. The method of claim 1, wherein the set of transmissions comprises both unicast messages and broadcast messages.

3. The method of claim 1, wherein the set of condition parameters causes the UE to select a broadcast message as the target transmission, and wherein updating the UE configuration based on the set of condition parameters comprises restricting the UE from determining clock times based on time values conveyed via unicast messages.

4. The method of claim 1, wherein selecting the target transmission comprises selecting the target transmission based on a determination that the target transmission is a broadcast message.

5. The method of claim 1, wherein the set of condition parameters causes the UE to select a unicast message as the target transmission, and wherein updating the UE configuration based on the configuration message comprises restricting the UE from determining clock times based on time values conveyed via broadcast messages.

6. The method of claim 1, wherein selecting the target transmission comprises selecting the target transmission based on a determination that the target transmission is a unicast message.

7. A user equipment (UE), comprising:
a memory configured to store computer programs; and
a processor configured to execute the computer programs stored in the memory to:
receive a configuration message comprising a set of condition parameters;
update a UE configuration based on the set of condition parameters;
receive a set of transmissions;
select a target transmission of the set of transmissions based on the UE configuration, wherein the target transmission comprises reference time information; and
determine a clock time for the UE based on the reference time information.

8. The UE of claim 7, wherein the set of transmissions comprises both unicast messages and broadcast messages.

9. The UE of claim 7, wherein the set of condition parameters causes the UE to select a broadcast message as the target transmission, and wherein updating the UE configuration based on the set of condition parameters comprises restricting the UE from determining clock times based on time values conveyed via unicast messages.

10. The UE of claim 7, wherein selecting the target transmission comprises selecting the target transmission based on a determination that the target transmission is a broadcast message.

11. The UE of claim 7, wherein the set of condition parameters causes the UE to select a unicast message as the target transmission, and wherein updating the UE configuration based on the configuration message comprises restricting the UE from determining clock times based on time values conveyed via broadcast messages.

12. The UE of claim 7, wherein selecting the target transmission comprises selecting the target transmission based on a determination that the target transmission is a unicast message.

13. A base station (BS), comprising:
  a memory configured to store computer programs; and
  a processor configured to execute the computer programs stored in the memory to:
    transmit a set of configuration messages comprising a set of condition parameters wherein the set of configuration messages causes user equipment (UE) to update a UE configuration based on the set of condition parameters;
    modify a base station (BS) configuration to send reference time information via a set of transmissions; and
    send the set of transmissions to the UE, wherein receiving the set of transmissions at the UE causes the UE to (i) select a target transmission of the set of transmissions based the target transmission satisfying a condition of the set of condition parameters and (ii) determine a clock time inside the UE based on the reference time information conveyed by the target transmission.

14. The BS of claim 13, wherein the target transmission is a radio resource control (RRC) message, and wherein the reference time information is conveyed via an information element (IE) of the RRC message.

15. The BS of claim 13, wherein the reference time information is identified with a target label, and wherein modifying the BS configuration comprises modifying the BS configuration to not send any unicast message comprising time values identified with the target label.

16. The BS of claim 15, wherein the reference time information is associated with the target label "ReferenceTimeInfo".

17. The BS of claim 13, wherein the set of condition parameters causes the UE to select a broadcast message as the target transmission.

18. The BS of claim 13, wherein selecting the target transmission comprises selecting the target transmission based on a determination that the target transmission is a broadcast message.

19. The BS of claim 13, wherein the set of condition parameters causes the UE to select a unicast message but not a broadcast message as the target transmission.

20. The BS of claim 13, wherein selecting the target transmission comprises selecting the target transmission based on a determination that the target transmission is a unicast message.

* * * * *